United States Patent [19]
Chang et al.

[11] Patent Number: 5,799,043
[45] Date of Patent: Aug. 25, 1998

[54] METHOD AND APPARATUS FOR DECODING A TWO-LEVEL RADIO SIGNAL

[75] Inventors: Chun-Ye Susan Chang, Boca Raton; James Rodney Webster, Boynton Beach; Clinton C. Powell, II, Lake Worth, all of Fla.

[73] Assignee: Motorola, Inc., Schaumburg, Ill.

[21] Appl. No.: 867,498

[22] Filed: Jun. 2, 1997

[51] Int. Cl.⁶ .................................................. H04L 25/34
[52] U.S. Cl. ........................... 375/286; 375/334; 375/360; 329/300; 329/302
[58] Field of Search .................... 375/286, 287, 375/325, 334, 336, 360; 329/304, 305, 300, 301, 303

[56] References Cited

U.S. PATENT DOCUMENTS

| | | | |
|---|---|---|---|
| 4,379,284 | 4/1983 | Boykin | 340/310 |
| 5,453,715 | 9/1995 | Lee | 329/302 |
| 5,640,428 | 6/1997 | Abe et al. | 375/334 |
| 5,724,001 | 3/1998 | Chang | 329/302 |
| 5,745,530 | 4/1998 | Back et al. | 375/342 |

FOREIGN PATENT DOCUMENTS 2 057 820  4/1981  United Kingdom.
2 173 364  10/1988  United Kingdom.

*Primary Examiner*—Wellington Chin
*Assistant Examiner*—Congvan Tran
*Attorney, Agent, or Firm*—Eduardo Guntin

[57] ABSTRACT

A selective call unit (800) comprising a receiver (100) and a processor (810) is used for decoding a 2-level radio signal. The processor (810) is adapted to convert in-phase and quadrature signals generated by the receiver (100) to a sequence of state transitions representative of the plurality of symbols. For each symbol in the plurality of symbols, the processor (810) counts the sequence of state transitions during a symbol period, and compares the recorded count to a predetermined threshold, thereby generating a comparison result. The processor (810) then calculates a bit decision threshold level based on an average of the comparison result for each symbol in the plurality of symbols. For each symbol in a plurality of subsequent symbols, the processor (810) then compares the bit decision threshold level to the sequence of state transitions counted during a symbol period to decode a digital logic level therefrom.

12 Claims, 8 Drawing Sheets

+ 4800 Hz

− 4800 Hz

METHOD AND APPARATUS FOR DECODING A TWO-LEVEL RADIO SIGNAL

RELATED INVENTION

The present invention is related to the following invention which is assigned to the same assignee as the present invention:

Application Ser. No. 08/753,816 filed Dec. 2, 1996, entitled "Method and Apparatus for Demodulating a Frequency Shift Keyed Signal."

FIELD OF THE INVENTION

This invention relates in general to selective call units, and particularly to a method and apparatus for decoding a 2-level radio signal.

BACKGROUND OF THE INVENTION

Presently, selective call units (SCU's) that receive 2-level radio signals utilize conventional peak and valley detectors to decode symbol data embedded in the 2-level radio signal. Such detectors require predetermined synchronization patterns such as comma patterns (i.e., patterns which include alternating "1's" and "0's") to properly decode symbol data. This requirement has several disadvantages.

First, predetermined patterns may be affected by burst errors in which case a conventional peak and valley detector may improperly determine threshold levels. As a result, decoding of symbol data may be errored. Moreover, peak and valley detectors may provide errored results when too many fixed symbols are received, e.g., a sequence of all "1's" and "0's." Under fixed data patterns, conventional detectors tend to converge to the fixed data level, and thereby provide false data during decoding. Although certain improvements have been added to conventional peak and valley detectors to limit the errored situations just described, such improvements have not been able to completely eliminate the possibility of errored decoding.

Accordingly, a method and apparatus that avoids the limitations of prior art decoders would be desirable. In particular, the method and apparatus should not require predetermined synchronization patterns for proper decoding of digital data embedded in a 2-level radio signal.

BRIEF DESCRIPTION OF THE DRAWINGS

The present invention is pointed out with particularity in the appended claims. However, other features of the invention will become more apparent and best understood by referring to the following detailed description in conjunction with the accompanying drawings in which:

DESCRIPTION OF THE PREFERRED EMBODIMENT

Figure 1:
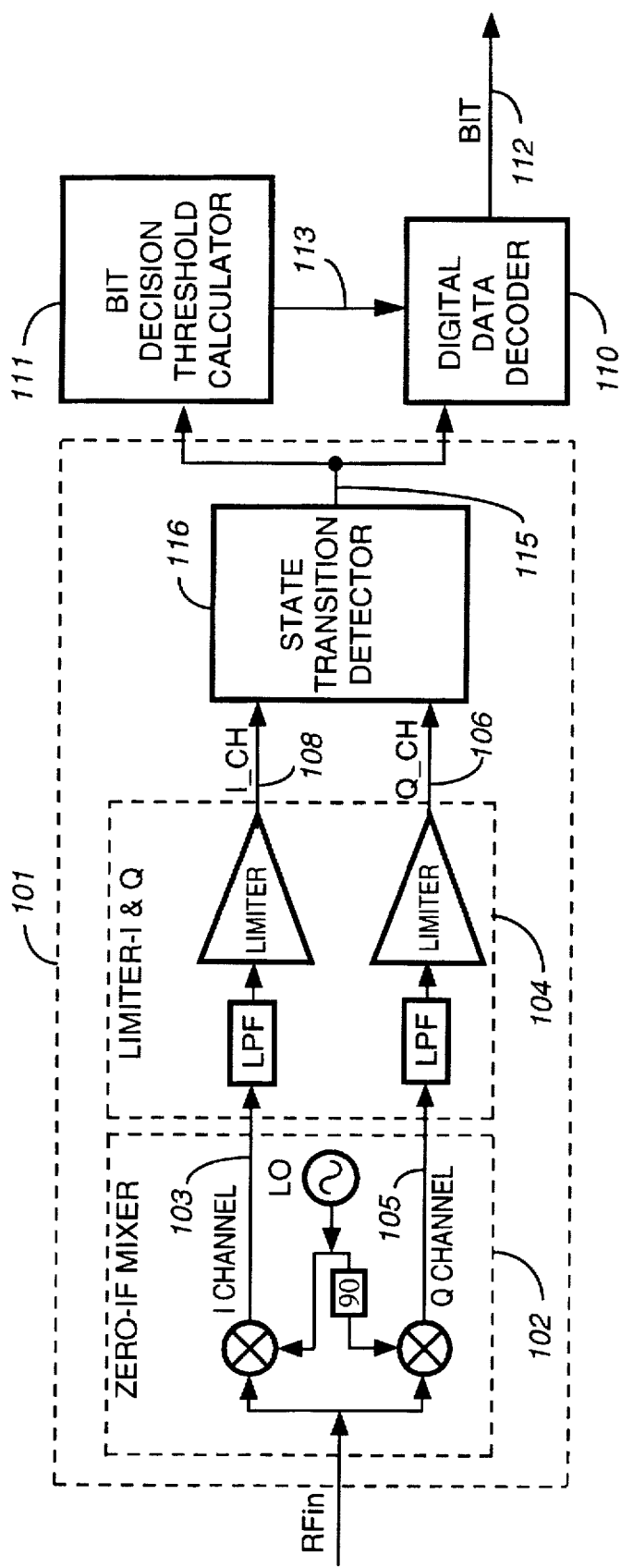
FIG. 1 shows an electrical block diagram of a 2-level radio receiver according to the present invention.

FIG. 1 is an electrical block diagram of an radio receiver 100 according to the present invention. The receiver 100 comprises a converter 101, a bit decision threshold calculator 111 and a digital data decoder 110. The converter 101 comprises a zero-IF mixer 102, an I-Q (in-phase and quadrature) limiter circuit 104, and a state transition detector 116. The zero-IF mixer 102 is a conventional non-coherent mixer comprised of in-phase and quadrature mixers driven from a substantially accurate local oscillator (LO) for generating an in-phase signal, and a quadrature signal, respectively. The zero-IF mixer 102 receives preferably an RF-FSK signal (radio frequency shift keyed signal shown as RF in FIG. 1) from a conventional high frequency antenna (not shown).

It will be appreciated that, alternatively, a conventional front-end mixer circuit such as, for example, a super-heterodyne circuit, along with a conventional quadrature mixer can be used in place of the zero-IF mixer 102. The front-end mixer is generally used for receiving FSK signals transmitted by a remote transmitter station at high frequencies (e.g., 900 MHz). After a high frequency FSK signal has been mixed by the front-end mixer circuit, an IF-FSK signal results, e.g., 455 KHz. The IF-FSK signal is then mixed down by quadrature mixers to generate an in-phase signal, and a quadrature signal, respectively.

Returning back to the preferred embodiment, once the zero-IF mixer 102 has mixed down the RF-FSK signal to baseband, the unconditioned in-phase and quadrature signals 103, 105 are then processed by the I-Q limiter circuit 104. The conditioning of these signals is performed by two low-pass filters (LPF) and two limiter circuits connected in tandem, respectively. The LPF's remove adjacent channel interference, while the limiters generate a two-level voltage signal representative of conditioned in-phase and quadrature signals (I_CH, and Q_CH) 108, 106, respectively. To do this, the limiter circuit preferably utilizes a one-bit conventional analog-to-digital converter.

The two-level in-phase and quadrature signals are then processed by a state transition detector 116, which detects transitions between states of the I-Q signals 108, 106 and generates state outputs which are applied to a state transition bus 115. The design and operation of the state transition detector 116 will be discussed in detail shortly. The data provided by the state transition bus 115 is then processed by the bit decision threshold calculator 111, and the digital data decoder 110.

The digital data decoder 110 decodes the data provided by the state transition bus 115 into digital symbol data. The digital data decoder 110 in this example illustrates the decoding of a 2-level FSK signal. For this reason, the output of the digital data decoder 110 is a one bit output signal 112. The one bit output signal 112 generated by the digital data decoder 110 can be utilized by a processor for decoding and operating a selective call unit, as will be discussed below.

It will be appreciated that, alternatively, modulation schemes other than a 2-level FSK signal may be used in the present invention, such as, for example, 2-level QAM (quadrature amplitude modulation) and 2-level PSK (phase shift keying). For illustration purposes only, the discussions that follow are focused on processing a 2-level FSK signal according to the present invention. These discussions should be viewed as being substantially similar to discussions regarding the processing of other 2-level radio signals according to the present invention.

The bit decision threshold calculator 111 processes the data provided by the state transition bus 115 and determines therefrom an appropriate bit decision threshold level used by the digital data decoder 110 for decoding the 2-level FSK signal. Once the bit decision threshold calculator 111 has made a determination, it generates a bit decision threshold level signal 113, which is received as input to the digital data decoder 110.

The discussions that follow will focus on the theory, design, and operation of the state transition detector 116 shown in FIG. 1. Particularly, FIGS. 2 through 4 introduce the reader to the important principles which are utilized in the design (shown in FIG. 5) of the state transition detector 116 according to the present invention. Both the bit decision threshold calculator 111 and the digital data decoder 110 utilize the data provided by the state transition detector 116.

Figure 6:
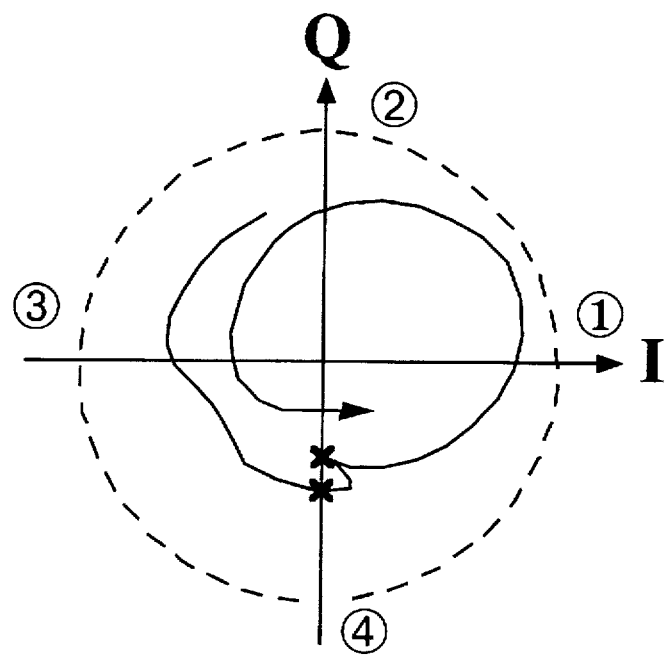
FIGS. 6 and 7 are illustrations of complex domain graphs of the inphase and quadrature signals in a noisy environment.
Figure 7:
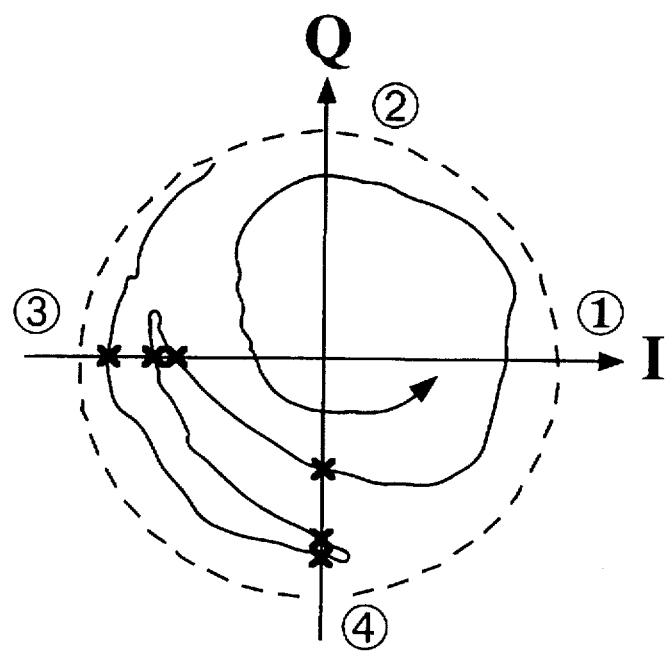
Figure 8:
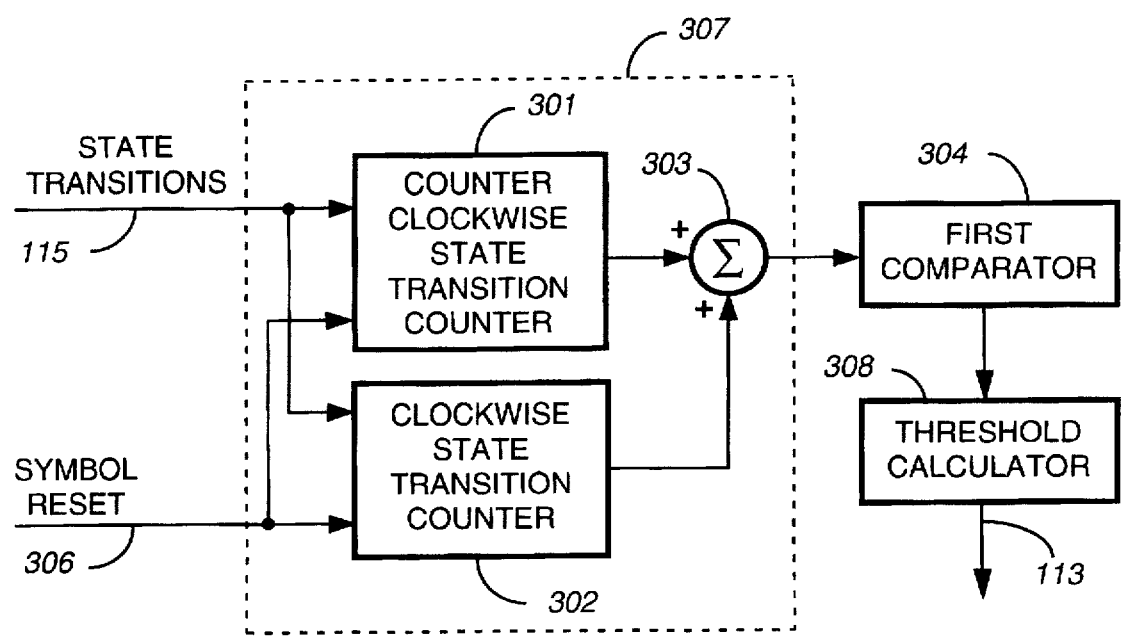
FIG. 8 shows an electrical block diagram of a bit decision threshold calculator according to the present invention.
Figure 9:
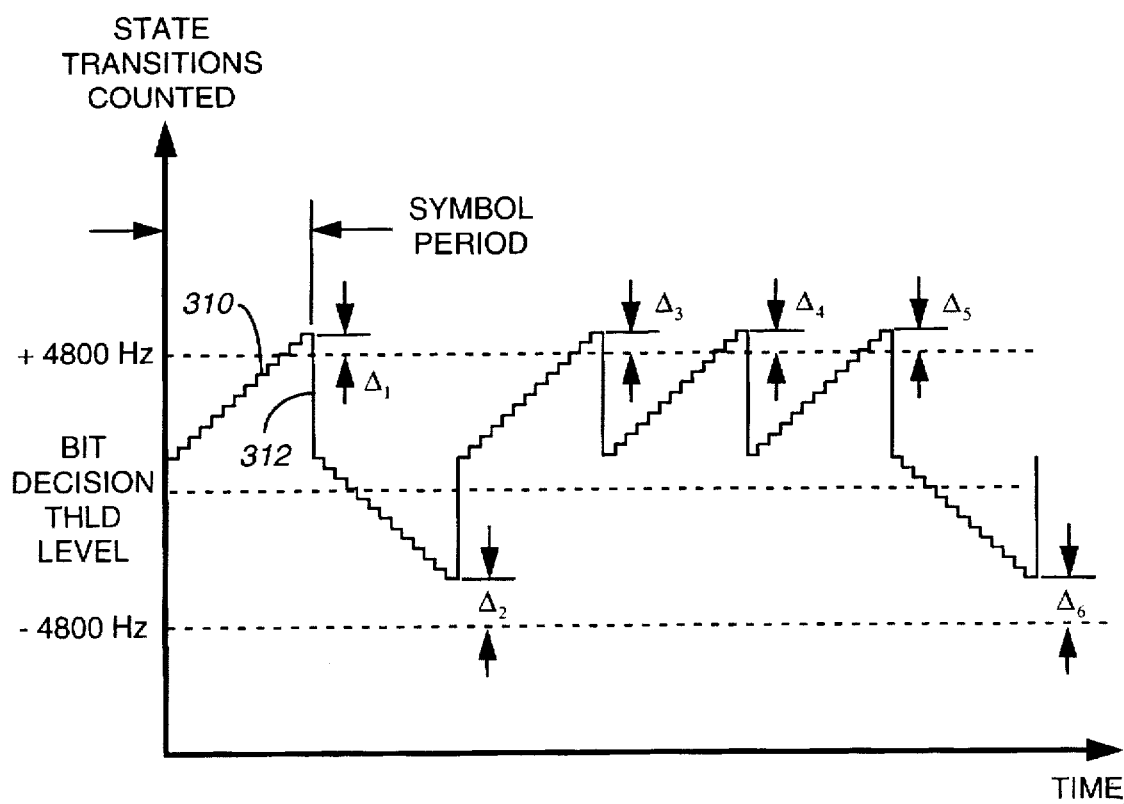
FIG. 9 depicts a timing diagram of how the bit decision threshold calculator adjusts for an offset in the 2-level FSK signal according to the present invention.
Figure 10:
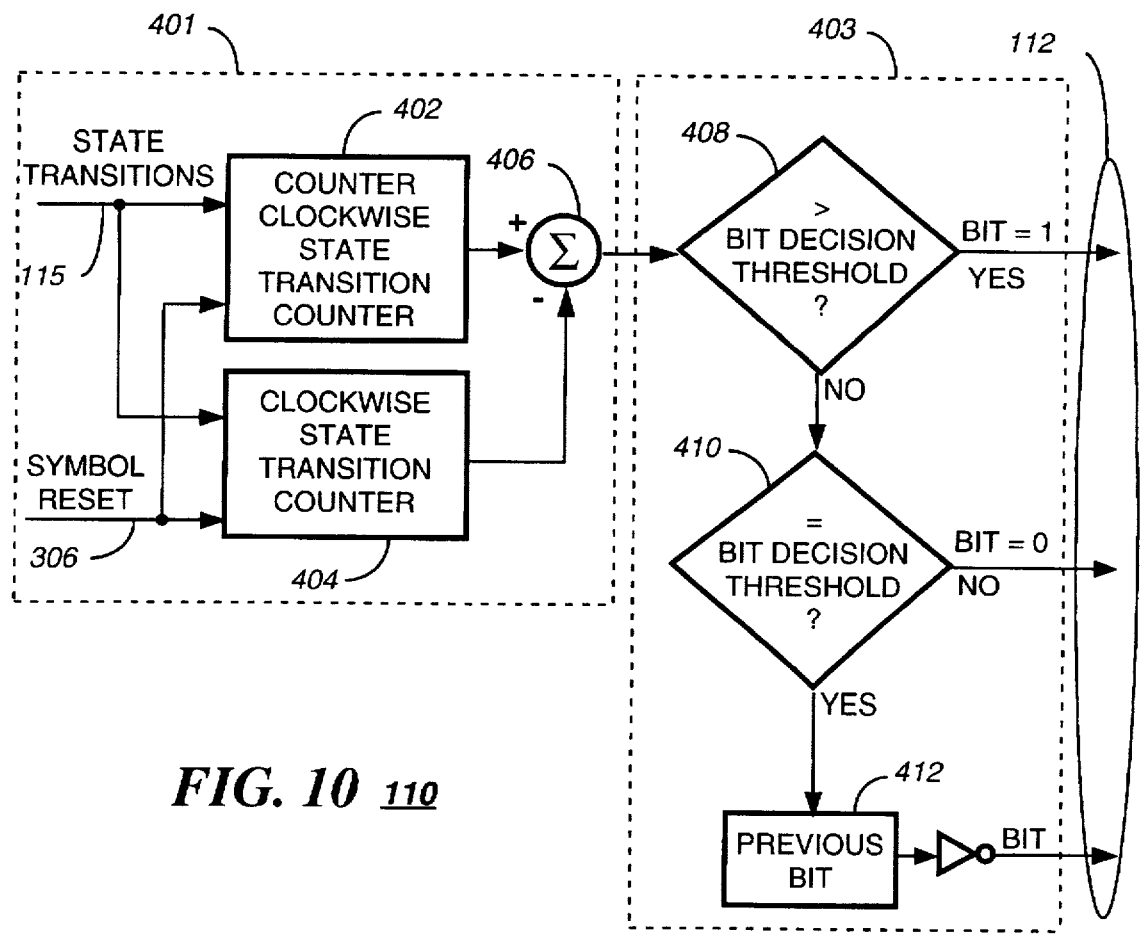
FIG. 10 shows an electrical block diagram of a digital data decoder according to the present invention.
Figure 11:
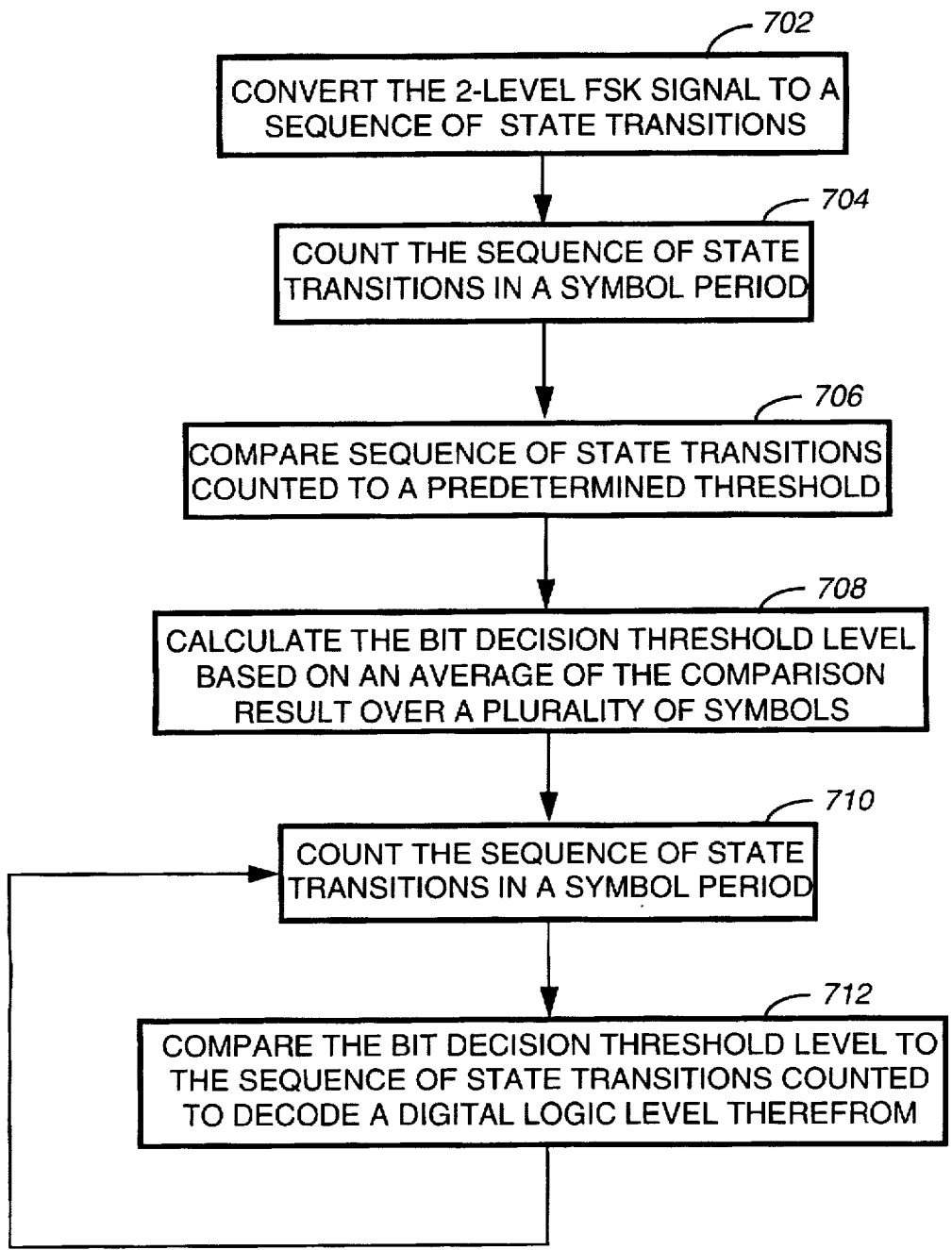
FIG. 11 shows a flow chart summarizing the operation of the receiver according to the present invention.
Figure 12:
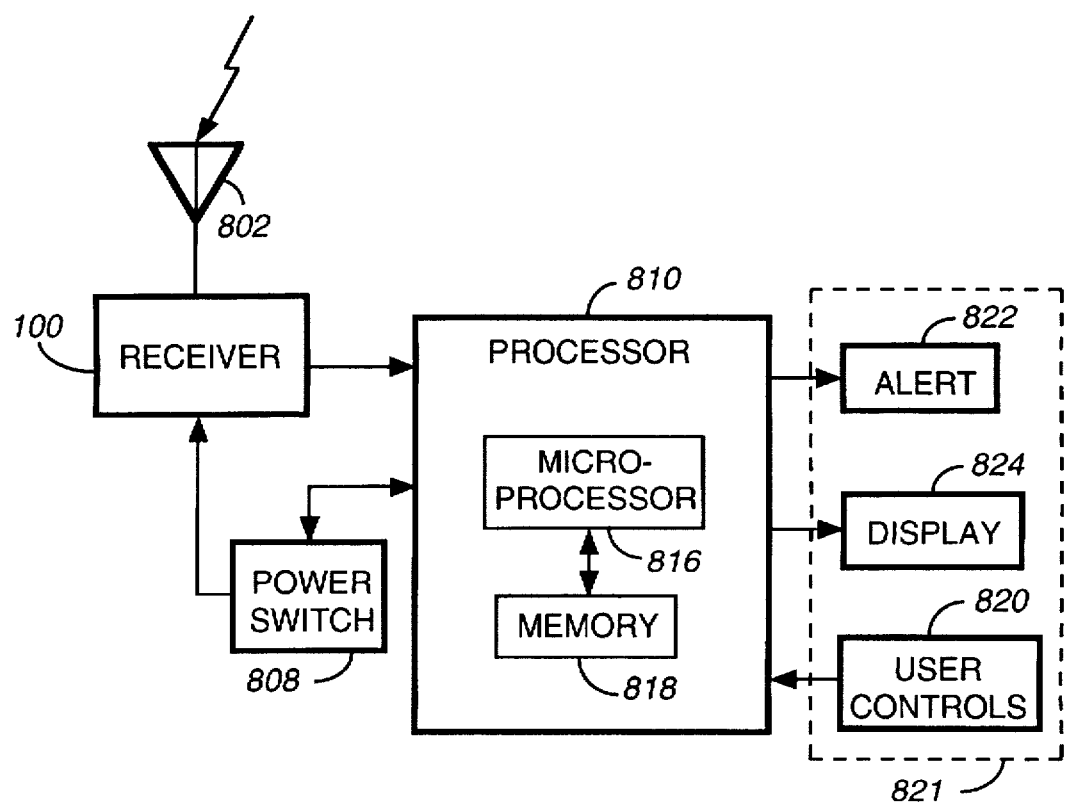
FIG. 12 shows an electrical block diagram of a selective call unit utilizing the receiver according to the present invention.

FIGS. 6 and 7 introduce the reader to important principles which are utilized in the design of the bit decision threshold calculator 111 and digital data decoder 110 according to the present invention. FIGS. 8 and 10 illustrate, by way of example, a hardware implementation of the bit decision threshold calculator 111 and the digital data decoder 110, respectively. FIG. 9 depicts a timing diagram illustrating the detection of symbol levels in the 2-level FSK signal based on the bit decision threshold level calculated by the bit decision threshold calculator 111. FIG. 11 summarizes the operations of the bit decision threshold calculator 111 and the digital data decoder 110. And finally, FIG. 12 illustrates the application of the present invention in a selective call unit.

Figure 2:
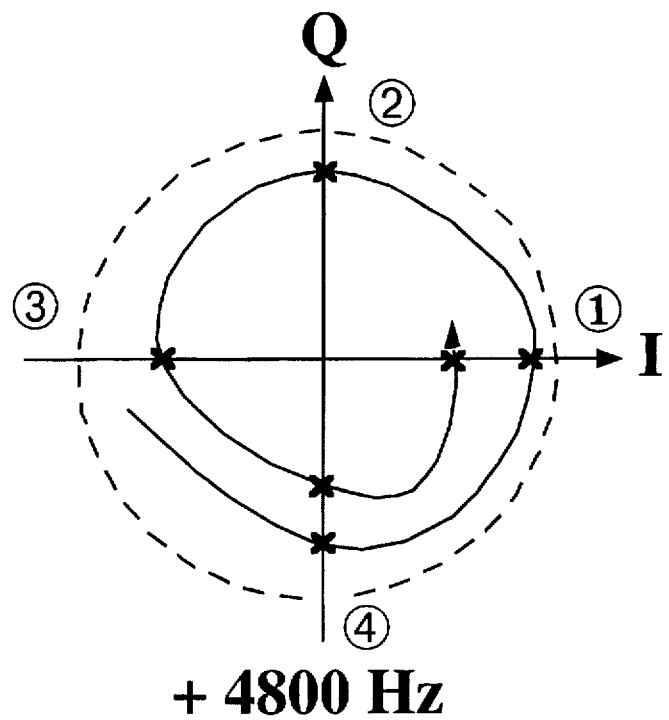
FIGS. 2 and 3 show illustrations of complex domain graphs of unconditioned in-phase and quadrature signals in a noise-free environment for each deviation of a 2-level FSK (frequency shift keyed) signal.
Figure 3:
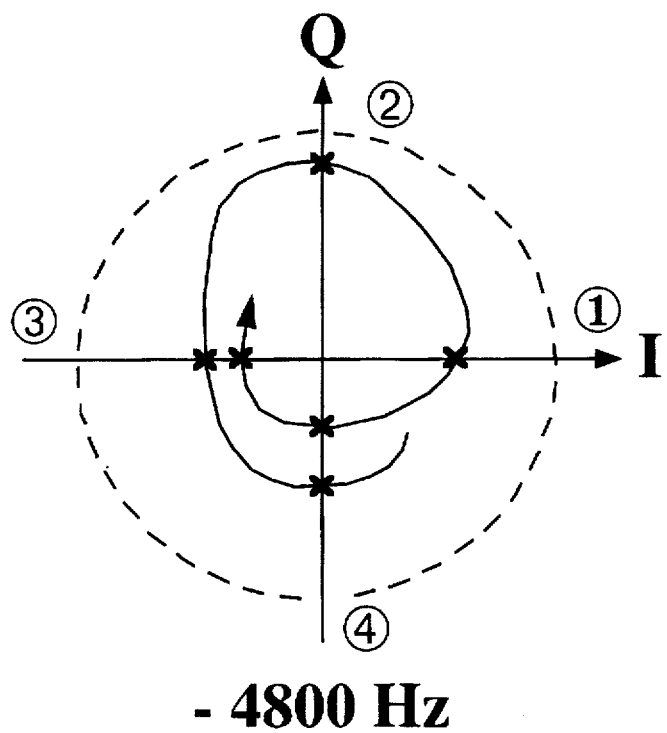

Beginning with FIGS. 2 and 3, these figures are illustrations of complex domain graphs of the unconditioned in-phase and quadrature signals 103, 105 in a noise-free environment for each deviation, respectively, of a 2-level FSK signal. These graphs illustrate characteristics of the in-phase and quadrature signals that the present invention takes advantage of in demodulating a 2-level FSK signal. The graphs illustrate deviations of ±4800 Hz from a frequency reference (e.g., 900 MHz carrier). In a complex domain system, the in-phase signal (I) is a signal representing the real part, and the quadrature signal (Q) is signal representing the imaginary part of a complex signal. After plotting the magnitude and phase of these signals in continuous time, the graphs shown in FIGS. 2 and 3 result.

Depending on whether the frequency deviation with respect to a frequency reference is positive or negative, the plotted signals have a clockwise or counter-clockwise direction. In particular, for positive deviations the rotation is counter-clockwise, and for negative deviation the rotation is clockwise. This characteristic of the in-phase and quadrature signals is utilized by the digital data decoder 110 to determine the polarity of the frequency deviation.

Another characteristic of in-phase and quadrature signals when plotted in a complex system is the number of rotations around the complex domain that occur as a result of the frequency deviation and the baud rate of the digital information transmitted with the 2-level FSK signal. Table 1 illustrates an example for a 2-level FSK signal transmitted at 1600 sps (symbols per second) with ±4800 Hz frequency deviations.

TABLE 1

| Symbols @ 1600 sps | Frequency Deviation | No. of Rotations |
|---|---|---|
| 1 | +4800 Hz | counter-clockwise 2–3 |
| 0 | −4800 Hz | clockwise 2–3 |

As Table 1 illustrates, a ±4800 Hz frequency deviation rotates 2 to 3 times in a counter-clockwise/clockwise direction around the complex domain. This characteristic of the in-phase and quadrature signals is utilized by the digital data decoder 110 to determine the magnitude of a demodulated frequency deviation. That is, the digital data decoder 110 counts the number of rotations around the complex domain and compares this information to predetermined ranges to determine the magnitude of the frequency deviation.

With these two pieces of information, i.e., direction of rotation and number of rotations, the digital data decoder 110 may decode frequency deviations into baseband digital data. As noted above, however, the I-Q limiter circuit 104 conditions the in-phase and quadrature signals into two level signals. As a result, the continuous curves shown in FIGS. 2 and 3 cannot be reproduced by the digital data decoder 110. Instead, a digitized representation of the in-phase and quadrature signals remains. These digitized points of data occur only on the I and Q axis's (shown as "x's" on these figures).

For the present invention, these crossings of the I and Q axis's are defined as states. The bit decision threshold calculator 111 and the digital data decoder 110 monitor a sequence of states, and a sequence of state transitions. A sequence of states is defined as a sequence of crossings of the I and Q axis's. A sequence of state transitions, on the other hand, is defined as a sequence of transitions between states. Note a transition from one state to the same state is not considered a state transition, and therefore is ignored by the bit decision threshold calculator 111 and the digital data decoder 110 when counting state transitions. This, as it will be shown, is a useful method for filtering noise.

Figure 4:
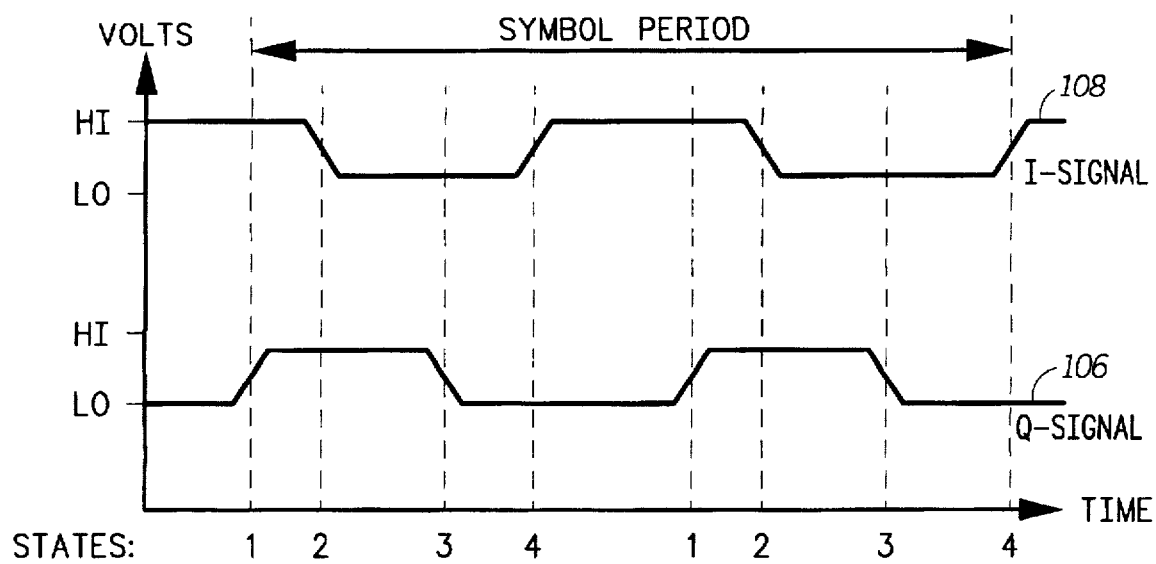
FIG. 4 shows an illustration depicting a sequence of state transitions of conditioned in-phase and quadrature signals.

FIG. 4 is an illustration depicting a sequence of state transitions of the conditioned in-phase and quadrature signals 108, 106. Note that the conditioned in-phase and quadrature signals 108, 106 (referred to herein as I-Q signals 108, 106) differ from the unconditioned in-phase and quadrature signals 103, 105 in that the former signals 108, 106 are digitized while the latter signals 103, 105 are not. This results in the square waveforms of FIG. 4 as opposed to sinusoidal waveforms representative of the unconditioned in-phase and quadrature signals 103, 105 (not shown). In determining the present state of the I-Q signals 108, 106, the state transition detector 116 monitors each edge transition (rising-edge or falling-edge) of the I-Q signals 108, 106 over a symbol period.

In the example shown in FIG. 4, the first rising-edge of the Q signal occurs while the I signal is high. This represents state 1 in the complex domain system (i.e., the positive I axis; see FIGS. 2 and 3). The next signal to switch levels is the I signal (falling-edge). During this edge transition the Q signal is HI representative of state 2 (i.e., the positive Q axis). Note the transition from state 1 to state 2 represents one sequence of a state transition. The next signal to switch is the Q signal (falling-edge). During this edge transition the I signal is LO representative of state 3 (i.e., the negative I axis). Finally, the I signal switches from LO to HI. During this edge transition the Q signal is LO representative of state 4 (i.e., the negative Q axis). The four edge transitions that follow represent a repetition of states 1–4 as depicted in FIG. 4.

By tracking the sequence of state transitions by way of the state transition detector 116, the bit decision threshold calculator 111 determines an appropriate bit decision threshold level signal 113, which the digital data decoder 110 uses to decode the 2-level FSK signal based on the direction of the I-Q signals 108, 106 around the complex domain (i.e., counter-clockwise or clockwise rotation), and the number of rotations. With this information, the digital data decoder 110 generates digitized one-bit data conforming with Table 1.

Figure 5:
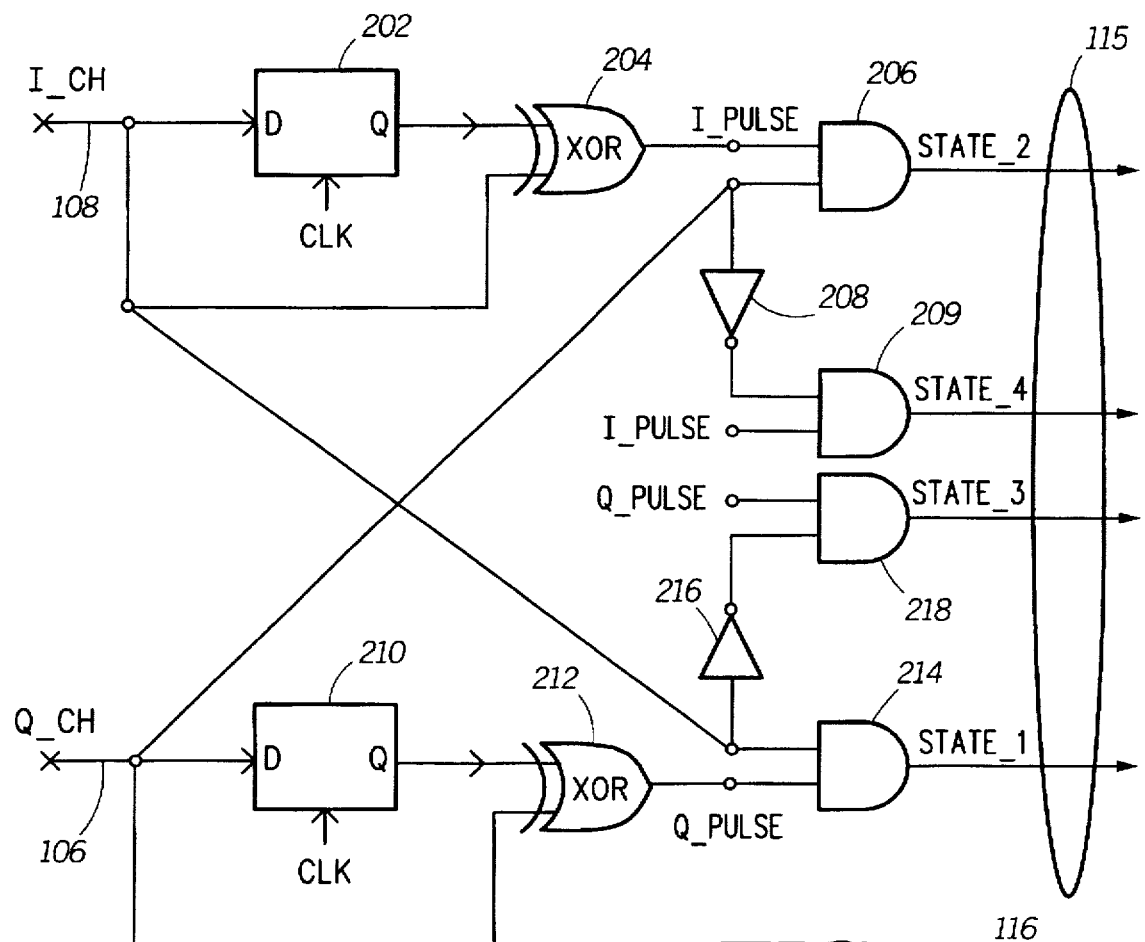
FIG. 5 shows an electrical block diagram of a state transition detector according to the present invention.

FIG. 5 is an electrical block diagram of a state transition detector 116 according to the present invention. As should be evident from the discussions above, the purpose of the state transition detector 116 is to detect transitions between states of the I-Q signals 108, 106.

The state transition detector 116 comprises two D Flip-Flops 202, 210, two Exclusive OR gates 204, 212, four AND gates 206, 209, 218, 214, and two inverters 208, 216. The state transition detector 116 receives as input the conditioned I-Q signals 108, 106 (as illustrated in FIG. 4). The D Flip-Flops 202, 210, which sample the I-Q signals 108, 106, are clocked by a sampling clock (CLK) that is several times faster than the rate of the I-Q signals 108, 106 (e.g., 76.8 KHz). The combination of the D Flip-Flop 202 and the X'OR 204 serves to detect a transition of the I signal. Similarly, the combination of the D Flip Flop 210 and X'OR 212 serves to detect a transition of the Q signal. When a transition is detected, these circuits generate an I_PULSE and a Q_PULSE, respectively, and the four AND gates 206, 209, 218, 214 in combination with the two inverters 208, 216 serve as state decoders.

For example, assume that the I signal 108 experiences a falling-edge transition, and during that transition the Q signal 106 is high. The falling-edge transition is going to be detected by the combination D Flip-Flop 202, and the X'OR 204, thereby generating a positive pulse, I_PULSE (the pulse duration is approximately one to one half cycles of the sampling clock—CLK). The I_PULSE is then received by both AND gates 206 and 209. AND gate 206 then generates an output representative of state 2 when it detects the I_PULSE and when the Q signal 106 is HI (i.e., the condition for state 2). Similarly, AND gate 209 generates an output representative of state 4 when it detects the I_PULSE and when the Q signal 106 is LO (i.e., the condition for state 4).

The signal generated by AND gate 206 has a duration approximately equal to the duration of I_PULSE. The other state decoders operate in a similar manner as just described. These state outputs (i.e., states 1–4) are applied to a state transition bus 115, which is utilized by an algorithmic state machine (of the bit decision threshold calculator 111 and the digital data decoder 110) for tracking transitions between states. Although this method of demodulation is effective in low-noise environments, further circuitry is necessary in communication systems that encounter Gaussian noise and Rayleigh fading.

FIGS. 6 and 7 are illustrations of complex domain graphs of the I-Q signals 108, 106 in noisy environments. FIG. 6 illustrates a situation where I-Q signals 108, 106 have embedded noise that results in state 4 transitioning on itself once (the crossings where the noise occurred is noted with "x's"). After the noise has subsided, the rest of the I-Q plot remains normal. This type of noise is typically a short random burst noise. To avoid this type of false state transition, the bit decision threshold calculator 111 and the digital data decoder 110 utilize an algorithmic state machine coupled to the state transition bus 115 which ignores state transition pulses of the same state.

The more complex situation arises when the burst error is a lengthy random error as shown in FIG. 7. In this example, states 3 and 4 have transitioned on themselves, which is ignored by the method just mentioned above. However, the transition from state 4 back to state 3, and then back to state 4 again is not ignored by the same circuit. For this situation, the digital data decoder 110 utilizes a more sophisticated algorithm, which will be described shortly.

FIG. 8 shows an electrical block diagram of the bit decision threshold calculator 111, which includes an algorithm for resolving the noise problems discussed for FIG. 6 (i.e., same state transitions), according to the present invention. The bit decision threshold calculator 111 comprises a first counter 307, a first comparator 304 and a threshold calculator 308.

The first counter 307 is used for counting the sequence of state transitions during a symbol period. This function is performed by the combination of a counter-clockwise state transition counter 301, and a clockwise state transition counter 302, each which is preferably implemented with conventional algorithmic state machines programmed to count upward and downward sequences of states (not including same state transitions), respectively. The upward and downward sequences of states are representative of clockwise and counter-clockwise rotations, respectively, about the I-Q complex domain.

The counter-clockwise state transition counter 301, and the clockwise state transition counter 302 receive input signals carried by the state transition bus 115. From these signals, the counters 301, 302 determine if the sequence of state pulses is representative of a clockwise rotation or a counter-clockwise rotation about the complex I-Q domain. Based on the direction of the sequence of state pulses, the appropriate counter is incremented. Note as stated earlier, transitions between the same state are ignored. This filtering function is preferably programmed into the conventional algorithmic state machine of each counter 301, 302.

The result of each counter 301, 302 is added by a summer 303. The first comparator 304 compares the output of the summer 303 to a predetermined threshold, thereby generating a comparison result. In this example, the predetermined threshold is equal to 12. This threshold value is derived from the expected number of state sequences in a 2-level FSK signal with deviations at ±4800 Hz with digital data transmitted at a baud rate of 1600 baud. This threshold can be arrived at by dividing the frequency deviation by the baud rate multiplied by the number of crossings in the complex I-Q coordinate system (i.e., 4800÷1600×4 crossings per rotation =12 state transitions).

It will be appreciated that 12 state transitions equate to 3 rotations about the I-Q complex domain. Therein, a predetermined threshold of 12 state transitions can also be interpreted as 3 rotations about the I-Q complex domain, a result consistent with Table 1.

The process described thus far is applied repeatedly during each symbol period. In order to reset the counters 301, 302 between symbol periods, a symbol reset signal 306 is used. This signal is preferably derived from a convention symbol detector (not shown).

The threshold calculator 308 calculates a bit decision threshold level signal 113 based on an average of the comparison result for each symbol in a plurality of symbols included in the 2-level FSK signal. For the present example, the threshold calculator 308 preferably averages the comparison result for each symbol over 12 samples of symbols of the 2-level FSK signal. By averaging over a large number of symbols, noise (such as a burst error) has a minimal impact in the accuracy of the bit threshold level signal 113. The averaging function applied by the threshold calculator 308 preferably follows the formula.

$$\sum_{k=1}^{N} \frac{\Delta_k}{N},$$

where $\Delta_k$ represents the comparison result per symbol, and where N represents the number of symbols processed. It will be appreciated that, alternatively, other averaging functions suitable to the present invention may be used.

FIG. 9 depicts a timing diagram of how the bit decision threshold calculator 111 adjusts for an offset in the 2-level FSK signal according to the present invention. Each staircase signal 310 is representative of the counters 301, 302, respectively, recording state transitions during a symbol period of the 2-level FSK signal. At the symbol boundaries, the counters 301, 302 are reset by the symbol reset signal 306.

The dashed lines shown as ±4800 Hz represent the ideal count boundaries of the respective counters 301, 302. In the situation where the frequency deviations ±4800 Hz are at a baud rate of 1600 baud, these boundaries is representative of a magnitude of 12 counts. When the 2-level FSK signal is experiencing a frequency offset, the counters 301, 302 are offset, thereby falling short and overextending beyond each boundary, as shown by this example. These boundaries serve as the predetermined threshold discussed above. In this example, each deficiency or overage as referenced by the predetermined threshold is represented by $\Delta_1$, through $\Delta_6$. After averaging comparison results preferably over 12 symbol periods, the threshold calculator 308 generates the bit decision threshold level signal 113, which is used by the digital data decoder 110 for decoding symbols of the 2-level FSK signal.

FIG. 10 shows an electrical block diagram of a digital data decoder 110 according to the present invention. The digital data decoder 110 comprises a second counter 401 and a second comparator 403. The second counter 401 is used for counting the sequence of state transitions during a symbol period. The second comparator 403 is used for comparing the bit decision threshold level signal 113 to the sequence of state transitions counted during the symbol period to decode the one-bit digital logic level signal 112 therefrom.

To accomplish this, the second counter 401 comprises counter-clockwise and clockwise counter 402, 404 substantially similar to the counter 301, 302 of FIG. 8. It will be appreciated that, alternatively, the same counters used for the bit decision threshold calculator 111 can be utilized by the digital data decoder 110, because as it will be discussed shortly the operation of the digital data decoder 110 is activated after the bit decision threshold calculator 111 has derived a bit decision threshold level signal 113. For the present example, however, these counters 402, 404 will remain independent. The second counter 401 further includes a subtraction element 406, which subtracts the result of the clockwise counter 404 from the counter-clockwise counter 402. The output of the subtraction element 406 is then processed by the second comparator 403.

The second comparator 403 utilizes any one of three decision elements 408–412 to generate the one-bit output signal 112. The first decision element 408 sets the one-bit output signal 112 to a logic level "1" when the output signal of the subtraction element 406 is above the bit decision threshold level signal 113. If it is not above this threshold, then decision element 410 sets the one-bit output signal 112 to a logic level "0" when the output signal of the subtraction element 406 is below the bit decision threshold level signal 113. If the output signal of the subtraction element 406 is equal to the bit decision threshold level signal 113, then the one-bit output signal 112 is set preferably the inverted value of the immediately preceding bit level of the one-bit output signal 112. Element 412 is implemented with a conventional memory element for storing a previously determined bit level of the output signal 112.

Several notes warrant the readers attention. First the clockwise and counter-clockwise counters 402, 404 are implemented, as described for FIG. 8, to ignore same state transitions, thereby eliminating the noise problem depicted in FIG. 6. Second, a situation where an excessive amount of noise is present in the 2-level FSK signal, such as shown in FIG. 7, may produce an outcome where the resulting subtraction from the subtraction element 406 is equal to the bit decision threshold level signal 113. To account for this infrequent problem, the second comparator 403 estimates the value of the one-bit output signal 112 as the inverted value of the previous one-bit output signal 112. Although this estimation may not always be accurate, an embedded error correction code in the digital data received from the 2-level FSK signal is likely to correct mistaken estimates.

Finally, the present algorithm for the bit decision threshold level signal 113 is data independent. That is, in contrast to prior art peak and valley detectors, the present algorithm for detecting 2-level symbols does not require a comma pattern (i.e., a pattern of alternating "0's" and "1's") for synchronization. The present invention is operational with sequence =of fixed patterns of "0's" or "1's".

FIG. 11 shows a flow chart 700 summarizing the operation of the receiver 100 according to the present invention. The flow chart 700 begins with step 702 where the receiver 100 converts the 2-level FSK radio signal to a sequence of state transitions which are applied to a state transition bus 115. To accomplish this, the receiver 100 utilizes a converter 101 comprising a zero-IF mixer 102, a limiter circuit 104, and a state transition detector 116, each described above. The receiver 100 then proceeds to steps 704 and 706 where the sequence of state transitions are counted during a symbol period and are compared to a predetermined threshold to determine whether a frequency offset is present in the demodulation of the 2-level FSK signal. The comparison results are provided to the bit decision threshold calculator 111, in step 708, to determine an appropriate bit decision threshold level signal 113 to be used by the digital decoder 110 to decode digital data.

The bit decision threshold level signal 113 is derived from an average of the comparison results generated in step 706 over a plurality of symbols (e.g., 12 symbol periods). Once the bit decision threshold level signal 113 has been determined, the receiver 100 proceeds to steps 710 and 712 for further processing of the 2-level FSK signal. In these steps, the receiver 100 again counts the sequence of state transitions in each symbol received, and compares the bit decision threshold level signal 113 to the sequence of state transitions counted. Based on the algorithm shown for the second comparator 403 in FIG. 10, the digital data decoder 110 determines a digital level which is applied to the one-bit output signal 112. These steps are repeated until no further symbols need to be processed.

FIG. 12 is an electrical block diagram of a selective call unit (SCU) 800 utilizing the receiver 100 according to the present invention. The SCU 800 comprises the receiver 100 described above coupled to a conventional antenna 802, a power switch 808, a processor 810, and a user interface 821. The receiver 100 and antenna 802 are utilized for receiving 2-level FSK signals that include messages transmitted by a radio communication system. The receiver 100 generates a one-bit signal 112, which is then processed by the processor 810. Based on the digital data provided on the one-bit signal 112, the processor 810 is programmed to reject or accept the 2-level FSK signal.

The power switch 808 is a conventional switch, such as a MOS (metal oxide semiconductor) switch for controlling power to the receiver 100 under the direction of the processor 810, thereby providing a battery saving function.

The processor 810 is used for controlling operation of the SCU 800. Generally, its primary function is to decode and process demodulated messages provided by the receiver 100, storing them and alerting a user of the received message. To perform this function, the processor 810 comprises a conventional microprocessor 816 coupled to a conventional memory 818 having nonvolatile and volatile memory portions, such as a ROM (read-only memory) and RAM (random-access memory). One of the uses of the memory 818 is for storing messages received from the radio communication system. Another use is for storing one or more selective call addresses utilized in identifying incoming personal or group messages to be intercepted by the SCU 800.

Once a message has been decoded and stored in the memory 818, the processor 810 activates the alerting device 822 (included in the user interface 821) which generates a tactile and/or audible alert signal to the user. The user interface 821, which further includes, for example, a conventional LCD display 824 and conventional user controls 820, is utilized by the user for processing the received messages. This interface provides options such as reading, deleting, and locking of messages.

To communicate messages to the SCU's 800, the radio communication system preferably utilizes a protocol such as the FLEX protocol, developed by Motorola, Inc. (FLEX is a trademark of Motorola, Inc.) for transmitting synchronous messages. The FLEX protocol is a digital selective call signaling protocol that is presently used by various system operators in the United States and in several other countries. It will be appreciated that, alternatively, other signaling protocols that are suitable to the present invention can be used.

In an alternative embodiment, certain functions of the receiver 100 are implemented in software with the use of the processor 810. In particular, the functions of the state transition detector 116, the bit decision threshold calculator 111 and the digital data decoder 110 are integrated in software, which is operated by the processor 810. Under this embodiment, the processor 810 is adapted to convert the in-phase signal 108 and the quadrature signal 106 to a sequence of state transitions representative of a plurality of symbols of the 2-level FSK signal. For each symbol in the plurality of symbols, the processor 810 counts the sequence of state transitions during a symbol period, and compares the sequence of state transitions counted to a predetermined threshold (as described above), thereby generating a comparison result. The processor 810 then calculates a bit decision threshold level based on an average of the comparison result for each symbol in the plurality of symbols.

The processing just described is preferably performed over a synchronization pattern embedded in the FLEX protocol used by the communication system for communicating with SCU's 800. Once synchronization has been completed, for each symbol in a plurality of subsequent symbols, the processor 810 proceeds to compare the bit decision threshold level to the sequence of state transitions counted during a symbol period to decode a digital logic level therefrom.

In sum, the present invention provides several advantages to prior art baud rate detectors. First, the implementation of the present invention is primarily a digital circuit, thereby providing a high degree of manufacturability, low cost and low power consumption. Second, the digital data decoder 110 is a substantial improvement over prior art peak and valley detectors, because contrary to prior art detectors, predetermined synchronization patterns such as comma patterns are not necessary to properly detect 2-level symbols. Moreover, because the bit decision threshold calculator 111 can be implemented in software, a substantial degree of flexibility can be designed into SCU's 800 utilizing the present invention. For example, under conditions of extreme noise, the bit decision threshold calculator 111 can be programmed to ignore a received signal, and maintain a hold state on the bit decision threshold level signal 113.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. A method for decoding digital data in a 2-level radio signal having a plurality of symbols, comprising the steps of:
    converting the 2-level radio signal to a sequence of state transitions representative of the plurality of symbols;
    for each symbol in the plurality of symbols,
        counting the sequence of state transitions during a symbol period, and
        comparing the sequence of state transitions counted to a predetermined threshold, thereby generating a comparison result;
    calculating a bit decision threshold level based on an average of the comparison result for each symbol in the plurality of symbols; and
    for each symbol in a plurality of subsequent symbols, comparing the bit decision threshold level to the sequence of state transitions counted during a symbol period to decode a digital logic level therefrom.

2. The method as recited in claim 1, wherein the digital logic level is equal to an opposite polarity of a previously determined digital logic level when the bit decision threshold level is equal in magnitude to the sequence of state transitions counted during a symbol period.

3. A method for decoding digital data in a 2-level FSK (frequency shift keyed) radio signal having a plurality of symbols, comprising the steps of:
    converting the 2-level FSK radio signal to a sequence of state transitions representative of the plurality of symbols;
    for each symbol in the plurality of symbols,
        counting the sequence of state transitions during a symbol period, and
        comparing the sequence of state transitions counted to a predetermined threshold, thereby generating a comparison result;
    calculating a bit decision threshold level based on an average of the comparison result for each symbol in the plurality of symbols; and for each symbol in a plurality of subsequent symbols, comparing the bit decision threshold level to the sequence of state transitions counted during a symbol period to decode a digital logic level therefrom, wherein the digital logic level is equal to an opposite polarity of a previously determined digital logic level when the bit decision threshold level is equal in magnitude to the sequence of state transitions counted during a symbol period.

4. A receiver for decoding digital data in a 2-level radio signal having a plurality of symbols, comprising:

a converter for converting the 2-level radio signal to a sequence of state transitions representative of the plurality of symbols;

a bit decision threshold calculator, comprising:
for each symbol in the plurality of symbols,
a first counter for counting the sequence of state transitions during a symbol period, and
a first comparator for comparing the sequence of state transitions counted to a predetermined threshold, thereby generating a comparison result;
a threshold calculator for calculating a bit decision threshold level based on an average of the comparison result for each symbol in the plurality of symbols; and a digital data decoder, comprising:
for each symbol in a plurality of subsequent symbols,
a second counter for counting the sequence of state transitions during a symbol period, and
a second comparator for comparing the bit decision threshold level to the sequence of state transitions counted during the symbol period to decode a digital logic level therefrom.

5. The receiver as recited in claim 4, wherein the digital logic level generated by the second comparator is equal to an opposite polarity of a previously determined digital logic level when the bit decision threshold level is equal in magnitude to the sequence of state transitions counted during a symbol period.

6. The receiver as recited in claim 4, wherein the converter comprises:

a zero-IF (intermediate frequency) mixer;

a limiter circuit; and a state transition detector.

7. A selective call unit comprising the receiver of claim 4.

8. A receiver for decoding digital data in a 2-level FSK radio signal having a plurality of symbols, comprising:

a converter for converting the 2-level FSK radio signal to a sequence of state transitions representative of the plurality of symbols;

a bit decision threshold calculator, comprising:
for each symbol in the plurality of symbols,
a first counter for counting the sequence of state transitions during a symbol period, and
a first comparator for comparing the sequence of state transitions counted to a predetermined threshold, thereby generating a comparison result;
a threshold calculator for calculating a bit decision threshold level based on an average of the comparison result for each symbol in the plurality of symbols; and a digital data decoder, comprising:
for each symbol in a plurality of subsequent symbols,
a second counter for counting the sequence of state transitions during a symbol period, and
a second comparator for comparing the bit decision threshold level to the sequence of state transitions counted during the symbol period to decode a digital logic level therefrom, wherein the digital logic level generated by the second comparator is equal to an opposite polarity of a previously determined digital logic level when the bit decision threshold level is equal in magnitude to the sequence of state transitions counted during a symbol period.

9. A selective call unit comprising the receiver of claim 8.

10. A selective call unit, comprising:

a receiver for demodulating a 2-level radio signal having a plurality of symbols to an in-phase signal and a quadrature signal; and a processor, the processor adapted to:
convert the in-phase signal and the quadrature signal to a sequence of state transitions representative of the plurality of symbols;
for each symbol in the plurality of symbols,
count the sequence of state transitions during a symbol period, and
compare the sequence of state transitions counted to a predetermined threshold, thereby generating a comparison result;
calculate a bit decision threshold level based on an average of the comparison result for each symbol in the plurality of symbols; and
for each symbol in a plurality of subsequent symbols, compare the bit decision threshold level to the sequence of state transitions counted during a symbol period to decode a digital logic level therefrom.

11. The selective call unit as recited in claim 10, wherein the digital logic level is equal to an opposite polarity of a previously determined digital logic level when the bit decision threshold level is equal in magnitude to the sequence of state transitions counted during a symbol period.

12. The selective call unit as recited in claim 10, wherein the receiver comprises:

a zero-IF mixer; and a limiter circuit.

* * * * *